(12) United States Patent
Wehmeyer et al.

(10) Patent No.: US 7,179,373 B1
(45) Date of Patent: Feb. 20, 2007

(54) REMOVING FOREIGN MATTER FROM AQUARIUM WATER

(75) Inventors: Horst Wehmeyer, Saddle Brook, NJ (US); Klaus W. Woltmann, Demarest, NJ (US)

(73) Assignee: Imagine Gold, L.L.C., South Hackensack, NJ (US)

( * ) Notice: Subject to any disclaimer, the term of this patent is extended or adjusted under 35 U.S.C. 154(b) by 0 days.

(21) Appl. No.: 11/414,654

(22) Filed: Apr. 28, 2006

(51) Int. Cl.
*A01K 63/04* (2006.01)
*F16K 31/44* (2006.01)

(52) U.S. Cl. .............. 210/167.23; 210/167.27; 210/242.1; 210/416.2; 210/776; 251/205; 251/319

(58) Field of Classification Search ............ 210/776, 210/167.01, 167.21, 167.23, 167.27, 241, 210/242.1, 416.1, 416.2; 251/205, 318, 319
See application file for complete search history.

(56) References Cited

U.S. PATENT DOCUMENTS

| | | | | |
|---|---|---|---|---|
| 3,552 A | * | 4/1844 | Barber | 251/120 |
| 3,491,722 A | * | 1/1970 | Levitov et al. | 119/251 |
| 3,669,271 A | * | 6/1972 | McGivern | 210/128 |
| 3,734,853 A | | 5/1973 | Horvath | |
| 4,333,829 A | | 6/1982 | Walther | |
| 4,405,458 A | * | 9/1983 | McHugh, Jr. | 210/242.3 |
| 4,663,037 A | * | 5/1987 | Breslin | 210/170.07 |
| 4,817,561 A | | 4/1989 | Byrne et al. | |
| 5,137,433 A | * | 8/1992 | Willinger et al. | 417/312 |
| 5,762,024 A | * | 6/1998 | Meilahn | 119/223 |
| 6,202,677 B1 | | 3/2001 | Chen et al. | |
| 6,869,530 B1 | | 3/2005 | Venezia | |

FOREIGN PATENT DOCUMENTS

JP          60-125481         *   7/1985

* cited by examiner

*Primary Examiner*—Fred G. Prince
(74) *Attorney, Agent, or Firm*—Arthur Jacob

(57) ABSTRACT

Apparatus and method for removing foreign matter from water at selected levels in an aquarium utilize a valving mechanism placed between a skimmer adjacent the upper surface of the water and a lower inlet adjacent the lower bottom of the aquarium, the valving mechanism being operated selectively to control the relative volume of the flow of water through the skimmer and through the lower inlet, and a corresponding continuous withdrawal of water, together with entrained foreign matter, passed through either one or both the skimmer and the lower inlet so as to remove foreign matter from selected levels in the aquarium.

16 Claims, 5 Drawing Sheets

REMOVING FOREIGN MATTER FROM AQUARIUM WATER

The present invention relates generally to the maintenance of aquariums and pertains, more specifically, to apparatus and method for the removal of unwanted foreign matter from water in an aquarium.

An increasing popularity of aquariums in homes, offices and other commercial settings has given rise to a myriad of improvements designed to simplify the maintenance of aquariums with minimal effort and expense. Among these improvements is a wide variety of aquarium water filtration devices which have the function of continuously removing unwanted foreign matter from the water contained in an aquarium and thereby maintain ecologically sound environmental conditions within the aquarium. These filtration devices usually are arranged to draw water from an aquarium at a fixed location within the aquarium, filter out foreign matter entrained within the drawn water, and return the then filtered water to the aquarium.

Water can be drawn from an aquarium at different levels within the aquarium, depending upon the requirements developed at various times within the cycles of operation of the aquarium. Thus, skimmers have been employed to draw water, together with entrained foreign matter, from adjacent the surface of the water in an aquarium for filtration and subsequent return to the aquarium. Other devices draw water from adjacent the bottom of the aquarium for removing accumulations of foreign matter at that level.

The present invention provides apparatus and method for the simple, convenient and effective withdrawal of water continuously from selected levels in a aquarium so as to enable the removal of entrained foreign matter from various levels within the aquarium, as determined by conditions observed in the aquarium, utilizing only a single apparatus. Thus, for example, during a feeding cycle when food particles are present adjacent the surface of the aquarium water it is desirable to preclude drawing water from upper levels within the aquarium, while water can be drawn from lower levels to sweep away unwanted matter settled adjacent the bottom of the aquarium. At other times, it may become necessary to skim unwanted matter from an upper level adjacent the surface of the aquarium, while precluding the drawing of water adjacent the bottom of the aquarium so as to attain maximum effectiveness in the skimming operation. At still other times, it may be most effective to draw some water from both upper and lower levels to maintain cleanliness throughout the aquarium.

In pursuit of the above, the present invention attains several objects and advantages, some of which are summarized as follows: Enables simple and convenient withdrawal of water, together with entrained foreign matter, from selected levels within an aquarium for continuous filtration to remove unwanted foreign matter, utilizing only a single, compact apparatus; allows for the manual selection of a level from which water is drawn from an aquarium for filtration so as to enable a selection based upon the observation of conditions in the aquarium; enables a selective diversion of the withdrawal of aquarium water among different levels in an aquarium as required during different cycles, such as feeding and cleaning cycles, utilizing a single apparatus and without interrupting the continuous flow of water to a filtration device; allows selected skimming or bottom cleaning, as required for the maintenance of a sound ecological environment in an aquarium, utilizing a single, compact apparatus; provides a simplified, economical apparatus, compatible with current aquarium filtration devices, for accomplishing the removal of foreign matter from selected levels in an aquarium with effectiveness, with greater ease, and with economy.

The above objects and advantages, as well as further objects and advantages, are attained by the present invention, which may be described briefly as apparatus for removing foreign matter from water at selected levels in an aquarium, the water being contained within the aquarium between a lower bottom of the aquarium and an upper surface of the water, the apparatus comprising: an upper member for placement at an upper level adjacent the upper surface of the water and having an inflow gate for admitting water adjacent the upper surface together with foreign matter entrained within the water admitted through the inflow gate; a lower member for placement at a lower level adjacent the lower bottom and having a lower inlet for admitting water adjacent the bottom of the aquarium together with foreign matter entrained within the water admitted through the lower inlet; a valving mechanism placed intermediate the upper member and the lower member, the valving mechanism including an upper valve member communicating with the inflow gate, a lower valve member communicating with the lower inlet, a valve chamber communicating with the upper valve member and with the lower valve member, and an intermediate valve member selectively movable between a position wherein the intermediate valve member is juxtaposed with the upper valve member to close communication between the valve chamber and the inflow gate and thereby preclude the flow of water from the inflow gate through the upper valve member and into the valve chamber while the flow of water from the lower inlet through the lower valve member and into the valve chamber is permitted, and another position wherein the intermediate valve member is placed intermediate the upper valve member and the lower valve member to open communication between the valve chamber and the inflow gate and to open communication between the valve chamber and the lower inlet, thereby permitting the flow of water from the inflow gate through the upper valve member and into the valve chamber, and the flow of water from the lower inlet through the lower valve member and into the valve chamber; and a withdrawal conduit communicating with the valving mechanism for the continuous withdrawal of water from the aquarium, together with entrained foreign matter, passed through either one or both the upper valve member and the lower valve member to remove foreign matter from selected levels in the aquarium.

In addition, the present invention provides a method for removing foreign matter from water at selected levels in an aquarium, the water being contained within the aquarium between a lower bottom of the aquarium and an upper surface of the water, the method comprising: placing an upper member at an upper level adjacent the upper surface of the water, the upper member having an inflow gate for admitting water adjacent the upper surface together with foreign matter entrained within the water admitted through the inflow gate; placing a lower member at a lower level adjacent the lower bottom, the lower member having a lower inlet for admitting water adjacent the bottom of the aquarium together with foreign matter entrained within the water admitted through the lower inlet; placing a valving mechanism intermediate the upper member and the lower member, the valving mechanism including an upper valve member communicating with the inflow gate, a lower valve member communicating with the lower inlet, a valve chamber communicating with the upper valve member and with the lower valve member, and an intermediate valve member;

selectively moving the intermediate valve member between a position wherein the intermediate valve member is juxtaposed with the upper valve member to close communication between the valve chamber and the inflow gate and thereby preclude the flow of water from the inflow gate through the upper valve member and into the valve chamber while the flow of water from the lower inlet through the lower valve member and into the valve chamber is permitted, and another position wherein the intermediate valve member is placed intermediate the upper valve member and the lower valve member to open communication between the valve chamber and the inflow gate and to open communication between the valve chamber and the lower inlet thereby permitting the flow of water from the inflow gate through the upper valve member and into the valve chamber and the flow of water from the lower inlet through the lower valve member and into the valve chamber; and withdrawing water continuously from the aquarium, together with entrained foreign matter, passed through either one or both the upper valve member and the lower valve member to remove foreign matter from selected levels in the aquarium.

Further, the present invention provides apparatus for removing foreign matter from water at selected levels in an aquarium, the water being contained within the aquarium between a lower bottom of the aquarium and an upper surface of the water, the apparatus comprising: a skimmer for placement at an upper level adjacent the upper surface of the water for admitting water adjacent the upper surface together with foreign matter entrained within a volume of water admitted through the skimmer; a lower inlet for placement at a lower level adjacent the lower bottom for admitting water adjacent the bottom of the aquarium together with foreign matter entrained within a volume of water admitted through the lower inlet; a withdrawal conduit for withdrawing a volume of water admitted through the skimmer and through the lower inlet; and a valving mechanism for selectively controlling one of the volume of water admitted through the skimmer and the volume of water admitted through the lower inlet relative to the other of the volume of water admitted through the skimmer and the volume of water admitted through the lower inlet within the volume of water withdrawn through the withdrawal conduit, thereby enabling a continuous withdrawal of selected volumes of water, together with entrained foreign matter, from selected levels in the aquarium.

Still further, the present invention includes a method for removing foreign matter from water at selected levels in an aquarium, the water being contained within the aquarium between a lower bottom of the aquarium and an upper surface of the water, the method comprising: placing a skimmer at an upper level adjacent the upper surface of the water for admitting water adjacent the upper surface together with foreign matter entrained within a volume of water admitted through the skimmer; placing a lower inlet at a lower level adjacent the lower bottom for admitting water adjacent the bottom of the aquarium together with foreign matter entrained within a volume of water admitted through the lower inlet; withdrawing a volume of water admitted through the skimmer and through the lower inlet; and selectively controlling one of the volume of water admitted through the skimmer and the volume of water admitted through the lower inlet relative to the other of the volume of water admitted through the skimmer and the volume of water admitted through the lower inlet within the volume of water withdrawn from the aquarium, thereby enabling a continuous withdrawal of selected volumes of water, together with entrained foreign matter, from selected levels in the aquarium.

The invention will be understood more fully, while still further objects and advantages will become apparent, in the following detailed description of preferred embodiments of the invention illustrated in the accompanying drawing, in which.

Figure 1:
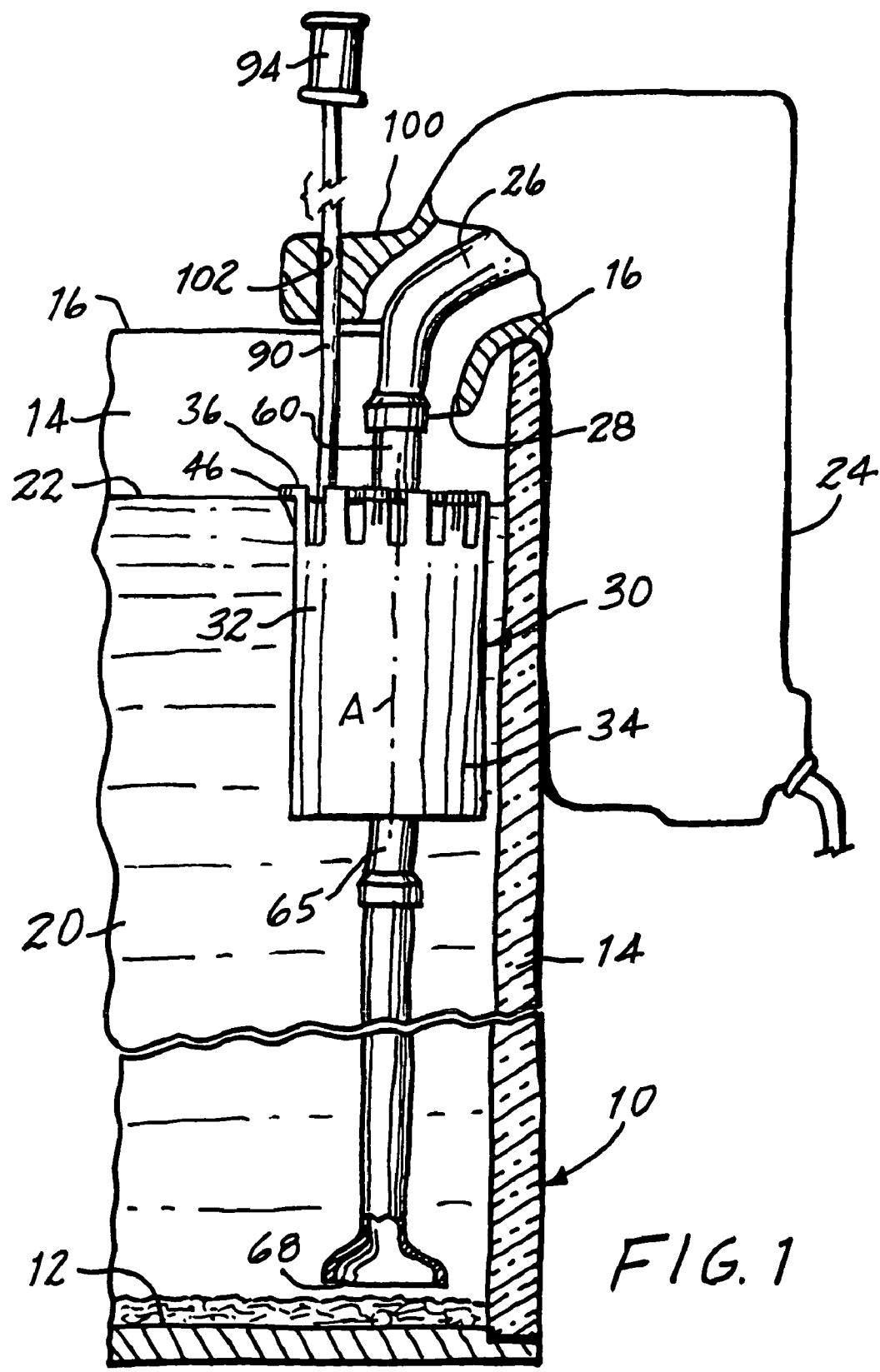
FIG. 1 is a somewhat diagrammatic, vertical cross-sectional view showing an apparatus constructed in accordance with the present invention, placed in an aquarium for operation in accordance with the method of the present invention.

Referring now to the drawing, and especially to FIG. 1 thereof, an aquarium 10 has a horizontal bottom 12 and vertical walls 14 extending upwardly from the bottom 12 to an uppermost edge 16 for containing water 20 within the aquarium 10 in a conventional manner. Thus, water 20 is contained within aquarium 10 between lower bottom 12 and an upper surface 22 of water 20. A conventional aquarium water filtration device 24 is mounted at the uppermost edge 16 of a wall 14 of aquarium 10 in a manner now well-known in the maintenance of aquariums, one such filtration device being illustrated in U.S. Pat. No. 4,512,885 to Willinger. Filtration device 24 draws water from aquarium 10 through an intake conduit 26 so as to receive water to be filtered, and includes a spillway 28 for returning filtered water to the aquarium 10.

Figure 2:
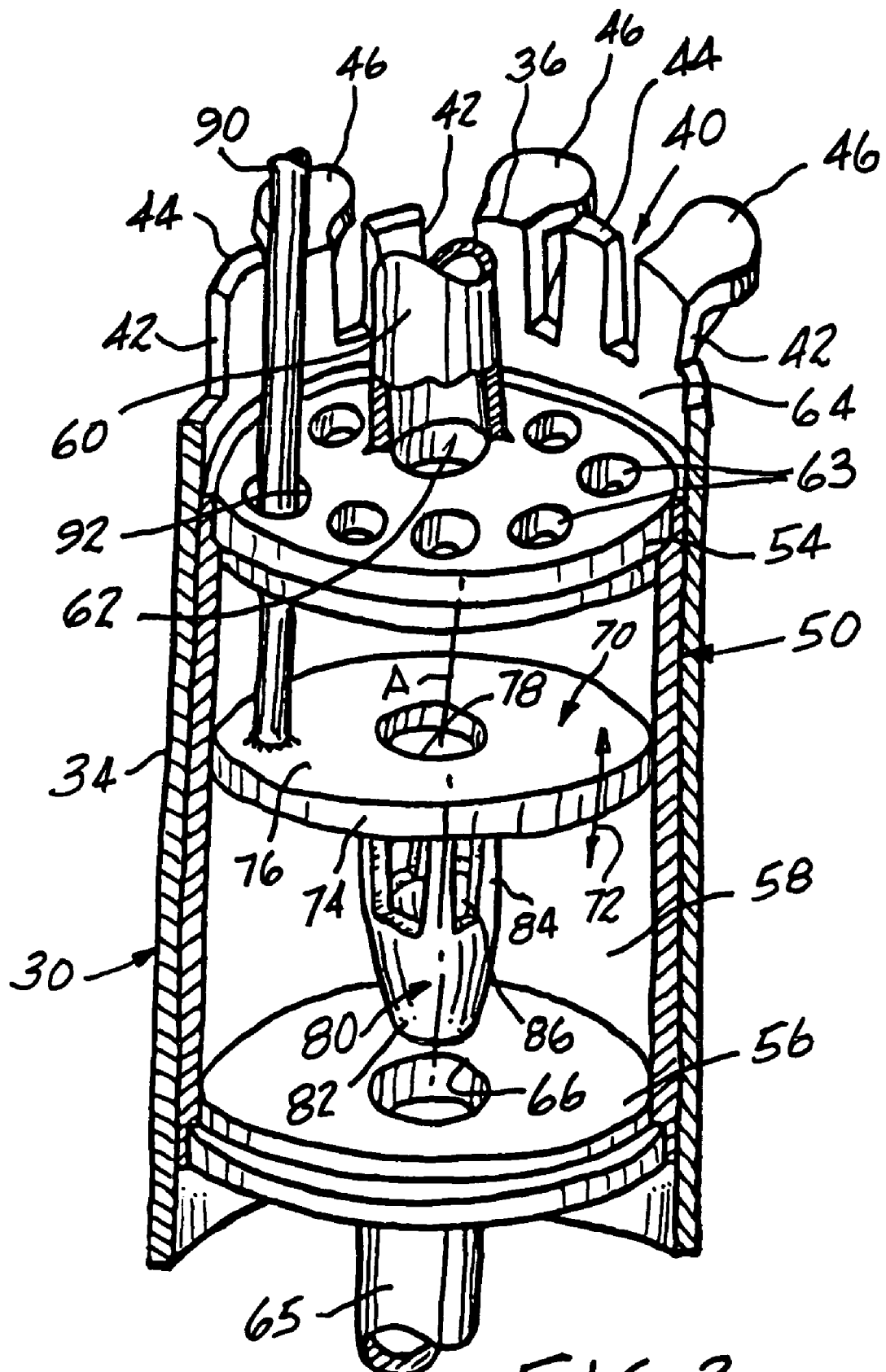
FIG. 2 is a somewhat diagrammatic, enlarged pictorial view of the apparatus, partially sectioned to show internal construction.

Turning now to FIG. 2, as well as to FIG. 1, apparatus constructed in accordance with the present invention is shown at 30 and is seen to include an upper member in the form of a skimmer 32 which includes a skimmer sleeve 34 constructed of a buoyant material so that the sleeve 34 is biased upwardly toward the surface 22 of the water 20 in the aquarium 10 for placement at an upper level adjacent the upper surface 22. The upper end 36 of sleeve 34 is castellated and provides an inflow gate 40 which includes circumferentially spaced apart slots 42 for admitting water 20 adjacent the upper surface 22. The castellated configuration provides columns 44 between the slots 42 for preventing larger debris as well as inhabitants of the aquarium from passing through inflow gate 40. Stabilizing elements in the form of floatation pads 46 are integral with and extend radially outwardly from the upper end 36 of sleeve 34, for purposes described more fully below.

A valving mechanism 50 includes a generally cylindrical valve wall 52 extending axially along a generally vertical axis A and carrying an upper valve member 54 and a lower valve member 56, both valve members 54 and 56 being fixed in place in the valve wall 52 at respective upper and lower ends of the valve wall 52 and establishing a valve chamber 58 between the upper and lower valve members 54 and 56. Upper valve member 54 is affixed to intake conduit 26 through a withdrawal conduit in the form of an outlet tube 60 and has a central outlet valve opening 62 which allows communication between valve chamber 58 and the intake conduit 26, via outlet tube 60. Upper valve member 54 includes a plurality of circumferentially spaced apart upper valve openings 63 which enable communication between valve chamber 58 and inflow gate 40, through an upper antechamber 64. Skimmer sleeve 34 extends circumferentially around valve wall 52 for sliding movement along valve wall 52 in upward and downward axial directions. The floatation pads 46, which are themselves buoyant and are spaced apart circumferentially around upper end 36 of the sleeve 34, ride upon surface 22 of water 20 so as to maintain appropriate alignment of the skimmer sleeve 34 with the valve wall 52 for facilitating sliding movement of the sleeve 34 along the valve wall 52 to assure that the inflow gate 40 always is placed relative to the surface 22 so that water 20 adjacent surface 22 will flow through gate 40 and into antechamber 64. Lower valve member 56 is affixed to a lower member in the form of an inlet tube 65 and has a central inlet valve opening 66 which allows communication between the valve chamber 58 and the inlet tube 65. An inlet 68 is placed at a lower level adjacent the bottom 12 of the aquarium 10 and communicates with the inlet tube 65.

An intermediate valve member 70 is placed within the valve chamber 58 and is movable upwardly and downwardly in axial directions within the valve chamber 58, as indicated by the arrow 72. In the position illustrated in FIG. 2, intermediate valve member 70 is shown located intermediate the upper and lower valve members 54 and 56. Intermediate valve member 70 includes a valve plate 74 having an upper valve face 76 and a central opening 78, and a throttle valve member 80 having a tapered lower valve face 82, the throttle valve member 80 being spaced downwardly from the valve plate 74 by circumferentially spaced apart struts 84 which establish circumferentially spaced apart ports 86 between adjacent struts 84.

An actuator in the form of a control rod 90 is coupled to intermediate valve member 70 for movement with the intermediate valve member 70 and extends upwardly through a bore 92 in upper valve member 54 to a control handle 94 and is movable selectively upwardly and downwardly, within bore 92, to, in turn, move intermediate valve member 70 upwardly and downwardly relative to the fixed upper and lower valve members 54 and 56, such upward and downward movements being effected manually by grasping control handle 94 to pull or push upon control rod 90. In order to maintain intermediate valve member 70 at a selected position within the valve chamber 58, control rod 90 extends through a retaining mechanism which includes a bracket 100 integral with filtration device 24 and having a frictional gripping surface 102 within the bracket 100. Control rod 90 frictionally engages frictional gripping surface 102 such that upon control rod 90 reaching a selected position, the frictional gripping surface 102 retains the control rod 90 in the selected position and, consequently, the intermediate valve member 70 in a corresponding selected position.

In an intermediate position of the intermediate valve member 70, as illustrated in FIG. 2, water 20 which spills through the inflow gate 40, adjacent upper surface 22, and into antechamber 64 is able to enter the valve chamber 58 and is withdrawn by proceeding to the filtration device 24 through outlet valve opening 62 and outlet tube 60. At the same time, water 20 which enters inlet 68, adjacent the bottom 12 of the aquarium 10, is able to enter the valve chamber 58, through inlet tube 65 and inlet valve opening 66, and is withdrawn by proceeding to the filtration device 24 via ports 86, central opening 78, outlet valve opening 62 and outlet tube 60. In this manner, water 20 is drawn from adjacent the surface 22 and from adjacent the bottom 12 for removing foreign matter floating at or near the surface 22 and foreign matter submerged at or near the bottom 12.

Figure 3:
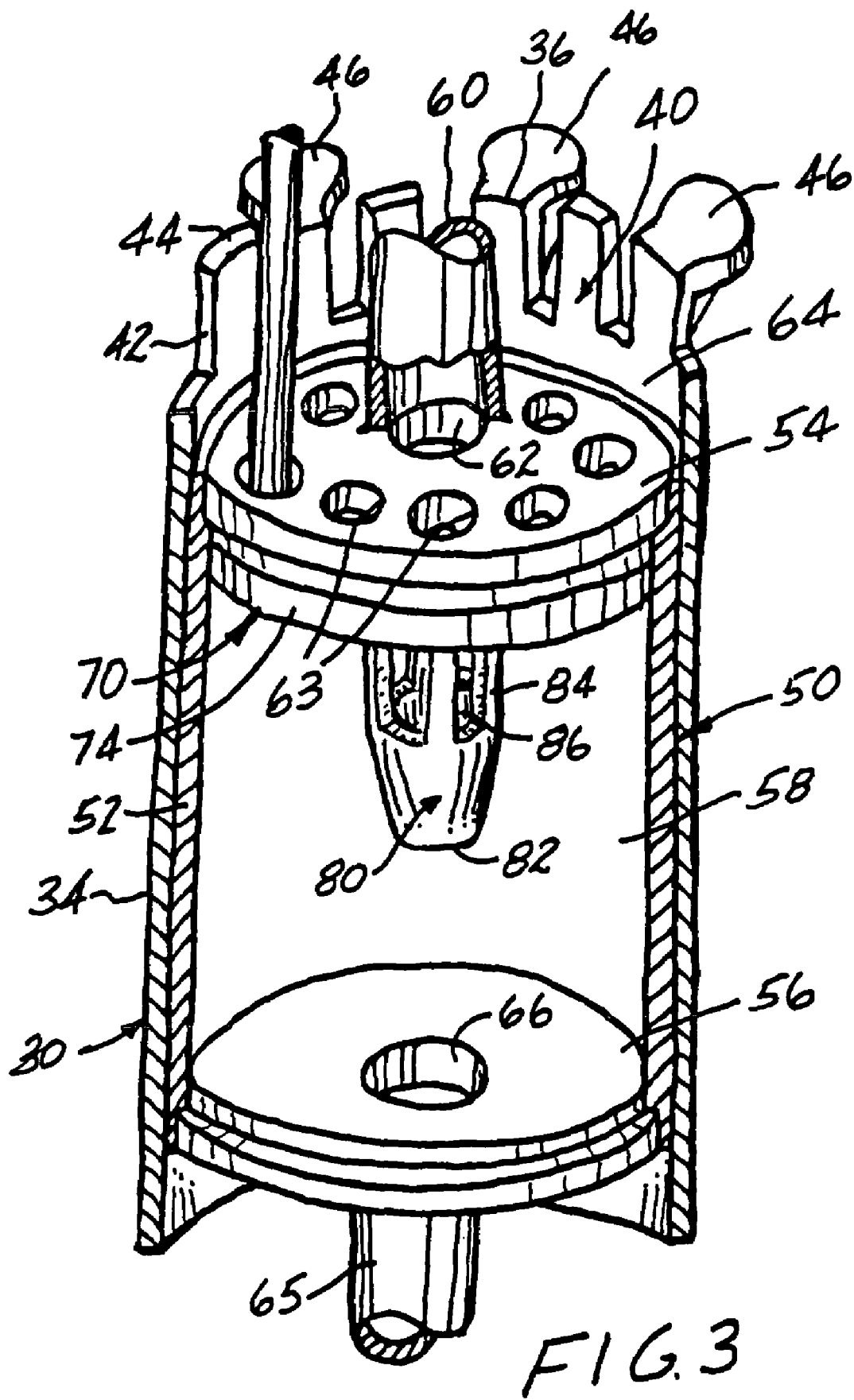
FIG. 3 is a pictorial view similar to FIG. 2 and showing component parts in another operating position.

Referring now to FIG. 3, as well as to FIG. 1, when it is desired to preclude drawing water 20 from adjacent surface 22, the passage of water 20 from adjacent the surface 22 into the valve chamber 58 is discontinued by selectively placing the intermediate valve member 70 at a position, shown in FIG. 3 as an upper position, wherein upper valve face 76 of valve plate 74 is juxtaposed with and engages upper valve member 54 to close upper valve openings 63, thereby closing communication between valve chamber 58 and antechamber 64 and precluding the flow of water 20 from adjacent surface 22 to the filtration device 24. For example, selecting that position of the intermediate valve member 70 during a feeding operation will prevent floating food particles from being drawn out of the aquarium 10 and passed into the filtration device 24, thus preventing interruption of the feeding cycle and potential clogging of the filtration device 24. At the same time, a maximum flow of water 20 is drawn from adjacent the bottom 12 of the aquarium 10, for maximizing the removal of deeply submerged foreign matter, the drawn water 20 being passed to the filtration device 24 via the valve chamber 58, the ports 86 and the central opening 78 in valve plate 74.

Figure 4:
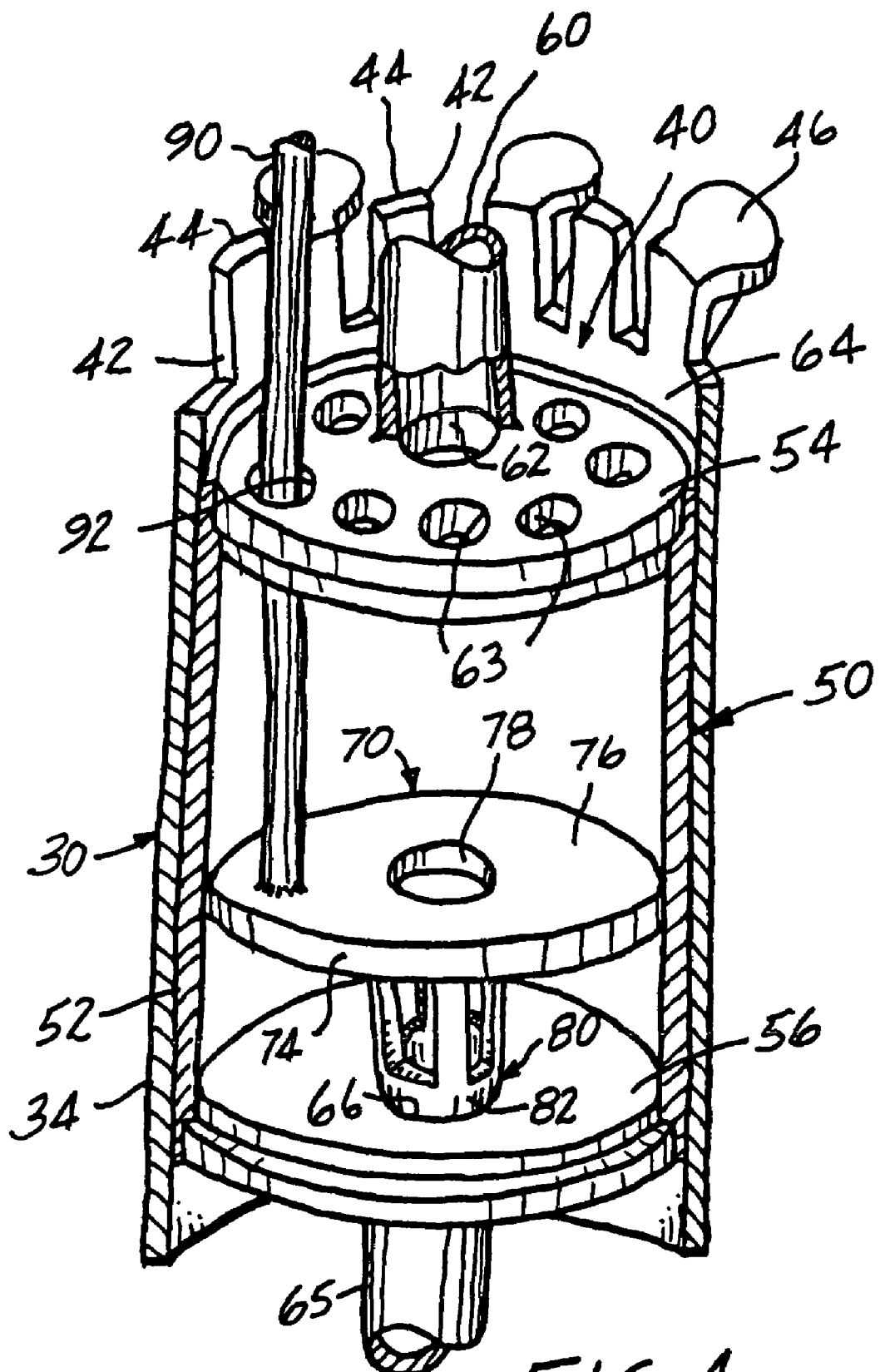
FIG. 4 is a pictorial view similar to FIG. 2 and showing component parts in still another operating position.

Turning now to FIG. 4, as well as to FIG. 1, when it is desired to preclude drawing water 20 from adjacent the bottom 12 of the aquarium 10, intermediate valve member 70 is placed selectively in another position, shown in FIG. 4 as a lower position, wherein tapered lower valve face 82 of throttle valve member 80 is juxtaposed with and engages lower valve member 56 to close inlet valve opening 66 and thereby preclude the flow of water 20 from inlet tube 65 into valve chamber 58 and, consequently, from adjacent bottom 12 to the filtration device 24. In this manner, maximum skimming is provided for attaining cleanliness adjacent the surface 22 of water 20.

Figure 5:
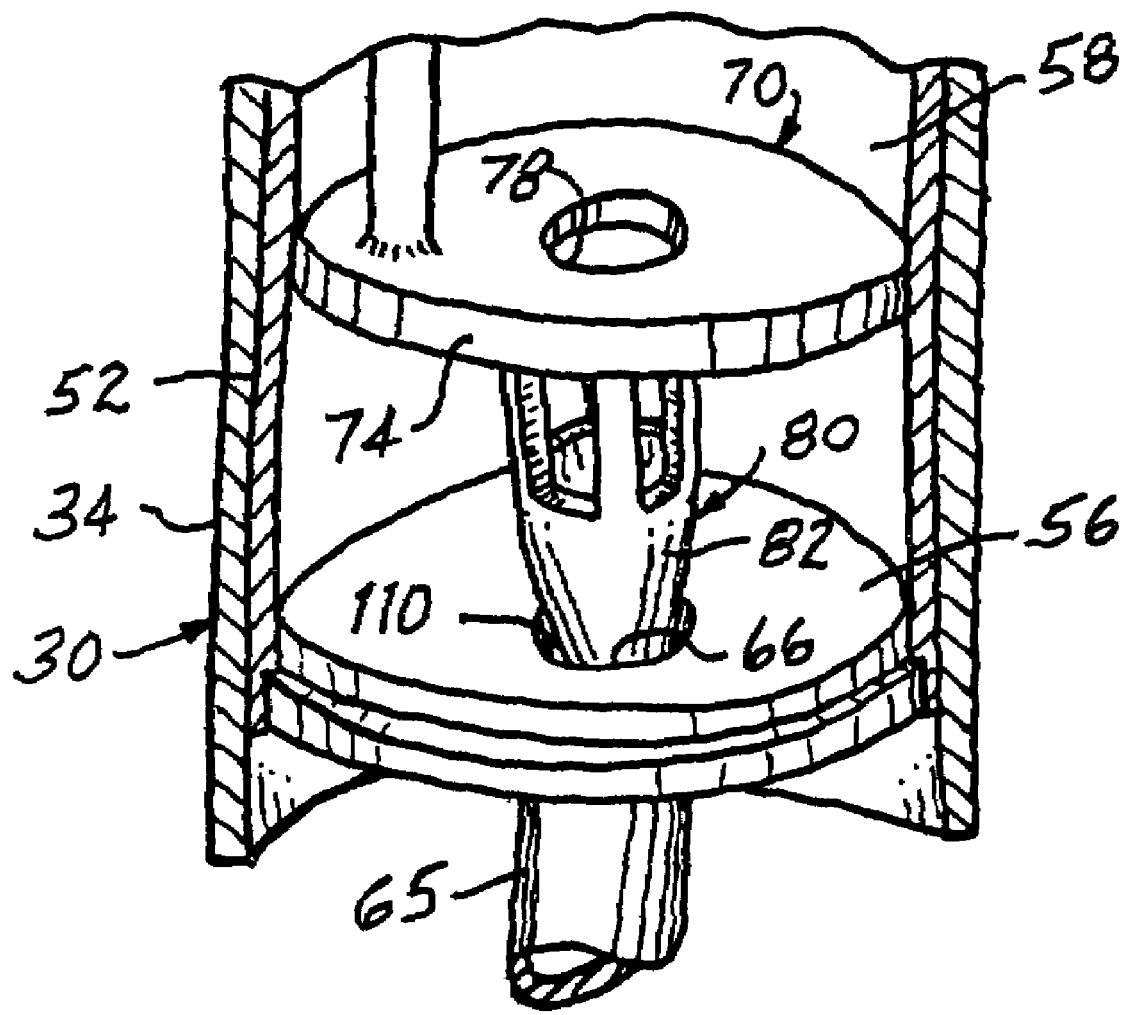
FIG. 5 is a fragmentary pictorial view of a portion of the apparatus and showing component parts in yet another operating position.

As seen in FIG. 5, the relative volume of flow of water through the upper and lower valve members 54 and 56 is selectively adjustable by selecting a throttling position of throttle valve member 80 relative to inlet opening 66. The tapered configuration of valve face 82 enables throttling, by axial movement of throttle valve member 80 among throttling positions for selective adjustment of the effective aperture 110 between valve face 82 and inlet valve opening 66, to increase or decrease communication between the inlet 68 and the valve chamber 58 so as to vary the volume of flow of water from the inlet 68 through the lower valve member 56 and into the valve chamber 58 and thus accomplish selective adjustment in the proportions of the volume of water flowing into the valve chamber 58 through the upper and lower valve members 54 and 56. In this manner, greater control is available for a selected combination of skimming and bottom cleaning.

Thus, merely by grasping handle 94 and moving rod 90 manually to a selected position, the single apparatus 30, constructed in accordance with the present invention, enables effective skimming, bottom cleaning, or a selected combination of both, all without interrupting a continuous flow of water 20 to the filtration device 24 and without disruption of the filtration of the aquarium water 20.

It will be seen that the present invention attains the several objects and advantages summarized above, namely: Enables simple and convenient withdrawal of water, together with entrained foreign matter, from selected levels within an aquarium for continues filtration to remove unwanted foreign matter, utilizing only a single, compact apparatus; allows for the manual selection of a level from which water is drawn from an aquarium for filtration so as to enable a selection based upon the observation of conditions in the aquarium; enables a selective diversion of the withdrawal of aquarium water among different levels in an aquarium as required during different cycles, such as feeding and cleaning cycles, utilizing a single apparatus and without interrupting the continuous flow of water to a filtration device; allows selected skimming or bottom cleaning, as required for the maintenance of a sound ecological environment in an aquarium, utilizing a single, compact apparatus; provides a simplified, economical apparatus, compatible with current aquarium filtration devices, for accomplishing the removal of foreign matter from selected levels in an aquarium with effectiveness, with greater ease, and with economy.

It is to be understood that the above detailed description of preferred embodiments of the present invention is provided by way of example only. Various details of design, construction and procedure may be modified without departing from the true spirit and scope of the invention, as set forth in the appended claims.

The invention claimed is:

1. Apparatus for removing foreign matter from water at selected levels in an aquarium, the water being contained within the aquarium between a lower bottom of the aquarium and an upper surface of the water, the apparatus comprising:
   an upper member for placement at an upper level adjacent the upper surface of the water and having an inflow gate for admitting water adjacent the upper surface together with foreign matter entrained within the water admitted through the inflow gate;
   a lower member for placement at a lower level adjacent the lower bottom and having a lower inlet for admitting water adjacent the bottom of the aquarium together with foreign matter entrained within the water admitted through the lower inlet;
   a valving mechanism placed intermediate the upper member and the lower member, the valving mechanism including an upper valve member communicating with the inflow gate, a lower valve member communicating with the lower inlet, a valve chamber communicating with the upper valve member and with the lower valve member, and an intermediate valve member selectively movable between a position wherein the intermediate valve member is juxtaposed with the upper valve member to close communication between the valve chamber and the inflow gate and thereby preclude the flow of water from the inflow gate through the upper valve member and into the valve chamber while the flow of water from the lower inlet through the lower valve member and into the valve chamber is permitted, and another position wherein the intermediate valve member is placed intermediate the upper valve member and the lower valve member to open communication between the valve chamber and the inflow gate and to open communication between the valve chamber and the lower inlet, thereby permitting the flow of water from the inflow gate through the upper valve member and into the valve chamber, and the flow of water from the lower inlet through the lower valve member and into the valve chamber; and
   a withdrawal conduit communicating with the valving mechanism for the continuous withdrawal of water from the aquarium, together with entrained foreign matter, passed through either one or both the upper valve member and the lower valve member to remove foreign matter from selected levels in the aquarium.

2. The apparatus of claim 1 wherein the intermediate valve member is selectively movable to a further position wherein the intermediate valve member is juxtaposed with the lower valve member to close communication between the valve chamber and the lower inlet and thereby preclude the flow of water from the lower inlet through the lower valve member into the valve chamber while the flow of water from the upper inlet through the upper valve member and into the valve chamber is permitted.

3. The apparatus of claim 1 wherein the intermediate valve member is selectively movable to throttling positions wherein the intermediate valve member is juxtaposed with the lower valve member to selectively increase and decrease communication between the valve chamber and the lower inlet and thereby vary the volume of flow of water from the lower inlet through the lower valve member and into the valve chamber while the flow of water from the upper inlet through the upper valve member and into the valve chamber is permitted so as to selectively adjust the relative volume of the flow of water through the upper and lower valve members.

4. The apparatus of claim 1 wherein the upper member is buoyant for maintaining the inflow gate adjacent the upper surface of the water.

5. The apparatus of claim 4 wherein the valving mechanism includes an axially-extending valve wall, the upper member includes a skimmer movable in axial directions along the valve wall, and stabilizing elements carried by the skimmer adjacent the inflow gate for stabilizing the skimmer relative to the valve wall to facilitate axial movement of the skimmer and maintenance of the inflow gate at the upper level.

6. The apparatus of claim 5 wherein the skimmer comprises a sleeve having an upper end and a castellated configuration at the upper end providing circumferentially spaced apart columns, and the stabilizing elements comprise floatation pads carried by at least some of the columns for riding upon the surface of the water.

7. The apparatus of claim 1 including an actuator coupled with the intermediate valve member for selective movement of the intermediate valve member to a selected position.

8. The apparatus of claim 7 wherein the actuator is movable manually to a selected position, and the apparatus includes a retaining mechanism for retaining the actuator in the selected position and the intermediate valve member in a corresponding position.

9. A method for removing foreign matter from water at selected levels in an aquarium, the water being contained within the aquarium between a lower bottom of the aquarium and an upper surface of the water, the method comprising:
   placing an upper member at an upper level adjacent the upper surface of the water, the upper member having an inflow gate for admitting water adjacent the upper surface together with foreign matter entrained within the water admitted through the inflow gate;
   placing a lower member at a lower level adjacent the lower bottom, the lower member having a lower inlet for admitting water adjacent the bottom of the aquarium together with foreign matter entrained within the water admitted through the lower inlet;
   placing a valving mechanism intermediate the upper member and the lower member, the valving mechanism including an upper valve member communicating with the inflow gate, a lower valve member communicating with the lower inlet, a valve chamber communicating with the upper valve member and with the lower valve member, and an intermediate valve member;

selectively moving the intermediate valve member between a position wherein the intermediate valve member is juxtaposed with the upper valve member to close communication between the valve chamber and the inflow gate and thereby preclude the flow of water from the inflow gate through the upper valve member and into the valve chamber while the flow of water from the lower inlet through the lower valve member and into the valve chamber is permitted, and another position wherein the intermediate valve member is placed intermediate the upper valve member and the lower valve member to open communication between the valve chamber and the inflow gate and to open communication between the valve chamber and the lower inlet thereby permitting the flow of water from the inflow gate through the upper valve member and into the valve chamber and the flow of water from the lower inlet through the lower valve member and into the valve chamber; and withdrawing water continuously from the aquarium, together with entrained foreign matter, passed through either one or both the upper valve member and the lower valve member to remove foreign matter from selected levels in the aquarium.

10. The method of claim 9 wherein the intermediate valve member is moved manually to a selected position.

11. The method of claim 9 wherein the intermediate valve member is moved to a further position wherein the intermediate valve member is juxtaposed with the lower valve member to close communication between the valve chamber and the lower inlet and thereby preclude the flow of water from the lower inlet through the lower valve into the valve chamber while the flow of water from the upper inlet through the upper valve member and into the valve chamber is permitted.

12. The method of claim 9 wherein the intermediate valve member is moved to a selected throttling position juxtaposed with the lower valve member to selectively increase and decrease communication between the valve chamber and the lower inlet and thereby vary the volume of flow of water from the lower inlet through the lower valve member and into the valve chamber while the flow of water from the upper inlet through the upper valve member and into the valve chamber is permitted so as to selectively adjust the relative volume of the flow of water through the upper and lower valve members.

13. Apparatus for removing foreign matter from water at selected levels in an aquarium, the water being contained within the aquarium between a lower bottom of the aquarium and an upper surface of the water, the apparatus comprising:

a skimmer for placement at an upper level adjacent the upper surface of the water for admitting water adjacent the upper surface together with foreign matter entrained within a volume of water admitted through the skimmer;

a lower inlet for placement at a lower level adjacent the lower bottom for admitting water adjacent the bottom of the aquarium together with foreign matter entrained within a volume of water admitted through the lower inlet;

a withdrawal conduit for withdrawing a volume of water admitted through the skimmer and through the lower inlet; and a valving mechanism for selectively controlling one of the volume of water admitted through the skimmer and the volume of water admitted through the lower inlet relative to the other of the volume of water admitted through the skimmer and the volume of water admitted through the lower inlet within the volume of water withdrawn through the withdrawal conduit, thereby enabling a continuous withdrawal of selected volumes of water, together with entrained foreign matter, from selected levels in the aquarium.

14. The apparatus of claim 13 wherein the valving mechanism is configured for selectively discontinuing passage of water from one of the skimmer and the lower inlet to the withdrawal conduit.

15. A method for removing foreign matter from water at selected levels in an aquarium, the water being contained within the aquarium between a lower bottom of the aquarium and an upper surface of the water, the method comprising:

placing a skimmer at an upper level adjacent the upper surface of the water for admitting water adjacent the upper surface together with foreign matter entrained within a volume of water admitted through the skimmer;

placing a lower inlet at a lower level adjacent the lower bottom for admitting water adjacent the bottom of the aquarium together with foreign matter entrained within a volume of water admitted through the lower inlet;

withdrawing a volume of water admitted through the skimmer and through the lower inlet; and selectively controlling one of the volume of water admitted through the skimmer and the volume of water admitted through the lower inlet relative to the other of the volume of water admitted through the skimmer and the volume of water admitted through the lower inlet within the volume of water withdrawn from the aquarium, thereby enabling a continuous withdrawal of selected volumes of water, together with entrained foreign matter, from selected levels in the aquarium.

16. The apparatus of claim 15 including selectively discontinuing passage of water from one of the skimmer and the lower inlet to the withdrawal conduit.

* * * * *